INVENTOR.
James O. Jackson

INVENTOR.
James O. Jackson

INVENTOR.
James O. Jackson
BY Green, McCallister & Miller
HIS ATTORNEYS

Dec. 5, 1961  J. O. JACKSON  3,011,674
DOUBLE SHELL PRESSURE TANK
Filed Nov. 12, 1957  5 Sheets—Sheet 4

INVENTOR.
James O. Jackson
BY Green, McCallister & Mille
HIS ATTORNEYS

Dec. 5, 1961 J. O. JACKSON 3,011,674
DOUBLE SHELL PRESSURE TANK
Filed Nov. 12, 1957 5 Sheets-Sheet 5
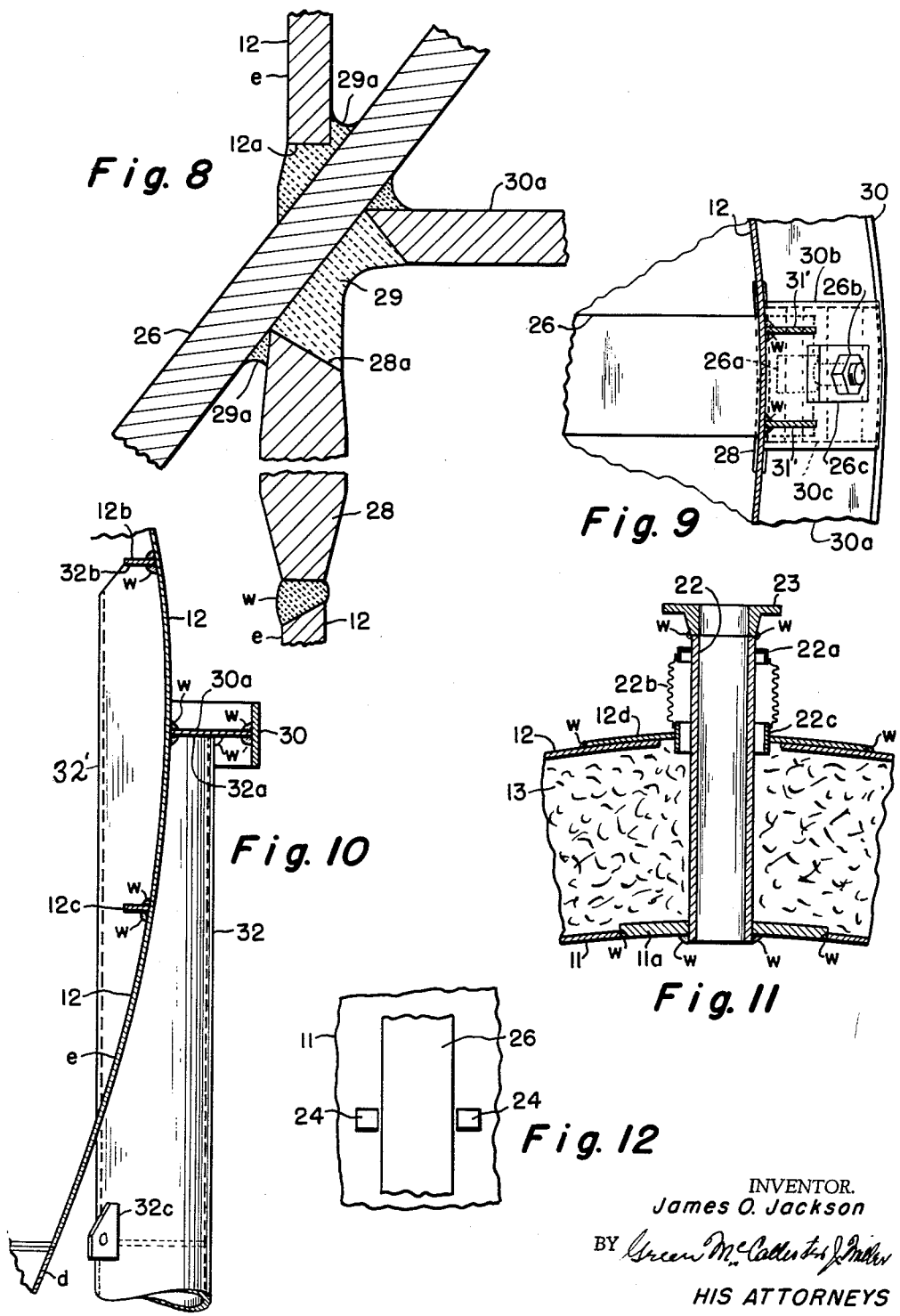
INVENTOR.
James O. Jackson
BY *Green McCallister & Miller*
HIS ATTORNEYS

United States Patent Office 3,011,674
Patented Dec. 5, 1961

3,011,674
DOUBLE SHELL PRESSURE TANK
James O. Jackson, Coraopolis, Pa., assignor to Pittsburgh-Des Moines Steel Company, Pittsburgh, Pa., a corporation of Pennsylvania
Filed Nov. 12, 1957, Ser. No. 695,907
10 Claims. (Cl. 220—15)

This invention relates to a storage tank construction suitable for relatively large size and heavy duty storage of fluid, gas or liquids. The invention relates particularly to vessels having a double-wall construction wherein the inner wall is insulated from and is supported by the outer wall.

An aspect of my invention involves the structural features of pressure vessels, particularly of rounded, continuous, curvilinear, spheroidal or spherical shape, also of vessels suitable for out-of-doors installation. I provide an effective hermetically-sealed relationship as to inner and outer shells of the tank and as to an expansion and insulating chamber or space between the shells and, at the same time, suspend the inner shell from the outer shell in such manner as to avoid localized and non-uniformly applied stresses and strains.

In carrying out my invention, I have developed a rounded, double-shell, insulated tank suitable as a container for a very cold fluid, such as liquid oxygen, the temperature of which may vary rather widely with respect to the atmospheric or ambient temperature, e.g., the storage temperature of liquid oxygen is about —320° F.

In a construction of this type, the inner container or shell has to withstand rather high as well as rather low temperature ranges and, under some conditions, the corrosive action of the fluid. Thus, it has to be of a suitable high alloy metal, such as of chrome-nickel steel plate. The weight of the liquid, itself, is great and the inner shell of the tank must, therefore, be well supported from the standpoint of static as well as dynamic forces, and the support structure must be such as to permit the independent expansion and contraction of the inner and outer shells.

The matter of support is complicated by the fact that the liquid contained in the inner part or shell of the tank must be maintained at a suitable temperature and, consequently, effective insulation must be provided between inner and outer shells of the tank.

Briefly stated, my invention involves a tank or vessel structure which is suitable for relatively large and heavy duty installations and to hermetically contain liquids at proper temperatures and pressures which do not necessarily conform to ambient or atmospheric conditions. In addition, certain of these liquids may have corrosive properties. I accomplish this by a new and improved type of support or suspension of the inner shell of the tank with respect to the outer shell and in an over-all construction that provides an effective and economic insulation as between the inner and outer shells and parts.

It has thus been an object of my invention to devise an improved tank construction suitable for heavy, out-of-door duty and for containing fluids, liquids or gases that may be relatively unstable.

Another object has been to provide a rounded or continuous double-wall tank construction in which an inner wall is suspended by and insulated from an outer wall;

A further object of my invention is the production of double shell tank in which the inner a rounded form of double shell tank in which the inner container or shell may contain and support a relatively heavy content of fluid maintained within a desired pressure and temperature range and in sealed-off relationship, and in which such shell may be supported in spaced relationship, relatively to the outer shell;

A still further object of my invention has been to produce an improved support structure for suspending a relatively large and heavy inner container which involves the use of a metallic means or harness in such a manner that the supported weight is, in effect, suspended from the outer enclosing shell;

A further object is to produce a supporting harness for the inner shell or container in which the harness is provided with adjusting means for substantially equalizing the strains imposed on both the supported shell and the harness by the weight of the inner shell and of the material contained therein;

These and other objects will appear to those skilled in the art from the illustrated embodiment and the description thereof herein set forth.

In the drawings, FIGURE 1 is a front view in elevation of a tank structure embodying my invention;

FIGURE 8 is a greatly enlarged vertical fragmental section of a portion of the structure of FIGURE 6, and illustrates a type of weld joint which is preferably employed between the outer shell and a harness for supporting an inner shell;

FIGURE 9 is a top or horizontal fragmental section on the scale of and taken along the line IX—IX of FIGURE 6;

FIGURE 10 is a fragmental section in elevation on a slightly smaller scale than FIGURES 6, 7, and 9, but on a larger scale than FIGURES 1 to 5; this figure is taken along the line X—X of FIGURE 3;

FIGURE 11 is an enlarged vertical fragmental section through a tank structure such as shown in FIGURES 1 and 2, but on an enlarged scale, to illustrate a typical pipe or conduit connection from the inner part, through an intermediate insulating and expansion space, and through the outer part; the conduit may be used for introducing and removing fluid from the tank;

Figure 2:
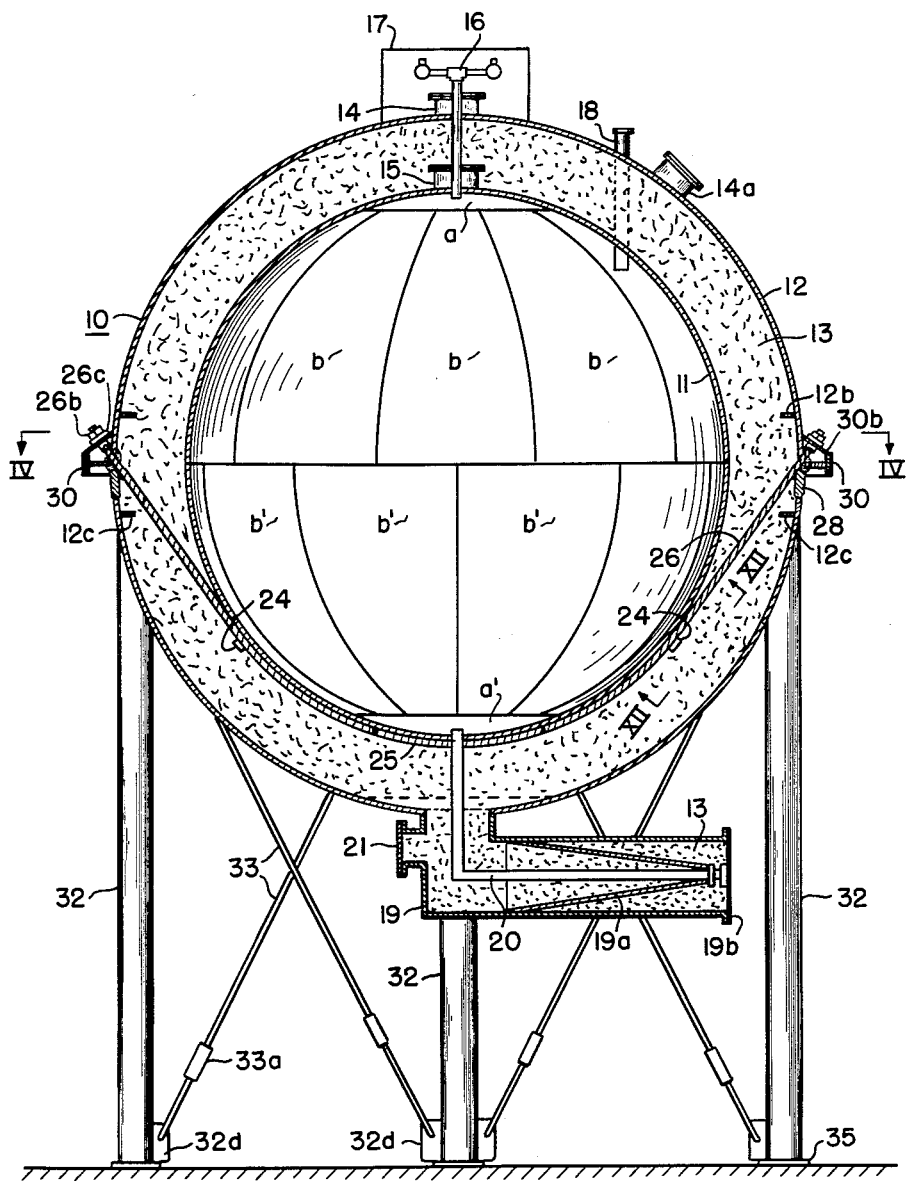
FIGURE 2 is a vertical section of the tank of FIGURE 1, the section being taken along a vertical plane through the center of the inner tank.

And FIGURE 12 is a fragmental view of the inner shell as if taken from the line XII—XII of FIGURE 2 but on a slightly larger scale than that of FIGURE 2; the view discloses a pair of metal guide bars welded to an outer surface of the inner shell and employed to align the shell with the suspension means, viz., with a radial suspension member forming a part of the suspending harness for the inner shell.

Figure 1:
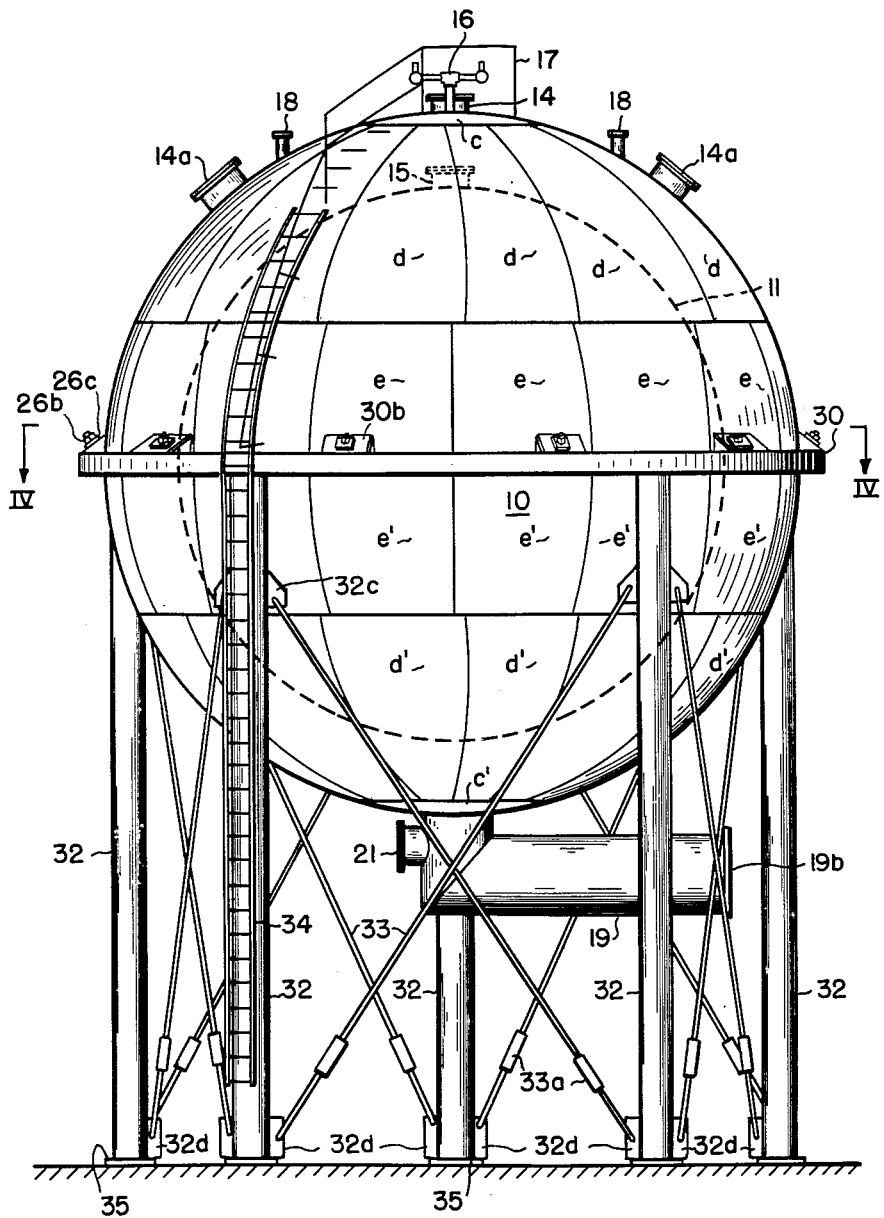

As shown in FIGURES 1 and 2, I provide a rounded pressure vessel or tank 10 including an inner shell 11 formed of suitable metal, such as a commercial type of stainless steel. The inner shell 11 of the illustrated structure, preferably is a hermetically sealed container (preferably spherical), adapted to contain a fluid (such as liquid oxygen) which is to be maintained at a requisite temperature and pressure, for example, at a relatively low temperature, such as −320° F. As shown, I provide an outer shell 12, radially spaced from and enclosing the inner shell 11. The inner and outer shells 11 and 12 are spaced so they define a relatively large closed-off insulating space which is preferably hermetically sealed.

The inner shell 11 may be and preferably is formed in two parts, viz., an upper and a lower part, each of hemispherical shape. Each such part is made up of metal plates and the two parts meet along a horizontal line that constitutes the medial or equatorial line of the inner spherical structure. The upper part of the sphere 11 includes in its make-up what may be termed a side band portion formed of shaped metal plates which are located edge to edge and welded together along their contacting meridional edges. These members are designated by the reference letter $b$ in FIGURES 2 and 4 and are located between the lower half of the sphere and a top closure member $a$ which is dished or rounded and is provided with a circular edge. This edge is engaged by the upper ends of the plates $b$ and is welded to those plates so that the upper portion of the sphere 11 is of semi-spherical shape.

The lower half of the sphere 11 likewise includes a so-called central band portion which is made up of a series of shaped metal plates $b'$ which are welded together along their curved meridional edges as shown in FIGURE 2. The lower ends of the plates $b'$ engage and are welded to a dished member $a'$ which corresponds in shape to the member $a$ and, therefore, has a circular edge which is secured to the lower ends of the series of plates $b'$. The edges of the plates $b$ and $b'$ which are located along the medial or equatorial line of the sphere 11 are welded together, thus completing the inner sphere.

Comparison of FIGURES 1 and 2 discloses that the outer shell 12 is also formed in two parts, viz., an upper and a lower part. Each such part is made up of shaped plates which are edge welded together. A reference to FIGURE 1 discloses that the preferred construction includes a dished cap plate $c$ which has a circular edge and may be termed the pole piece of the upper half of the sphere. The make-up of that half of the sphere also includes a series of shaped plates $d$ which are edge welded to each other and to the circular edge of the plate $c$. The lower edges of the plates $d$ engage and are welded to the upper edges of a series of shaped plates $e$ which are welded together along their curved meridional edges and, with the plate $c$ and the plates $d$, form the upper half of the central band of the sphere 12.

The lower half of the sphere 12 is correspondingly formed and includes a dished plate $c'$ having a circular edge, a series of plates $d'$ which are edge welded together and are also welded to the so-called pole piece $c$, and a series of plates $e'$ which are edge welded together with their lower edges secured by welding to the upper edges of the series of plates $d'$.

The halves of the spheres are secured together by welding the lower edges of the series of plates $e$ to the upper edges of the series of plates $e'$.

Figure 3:
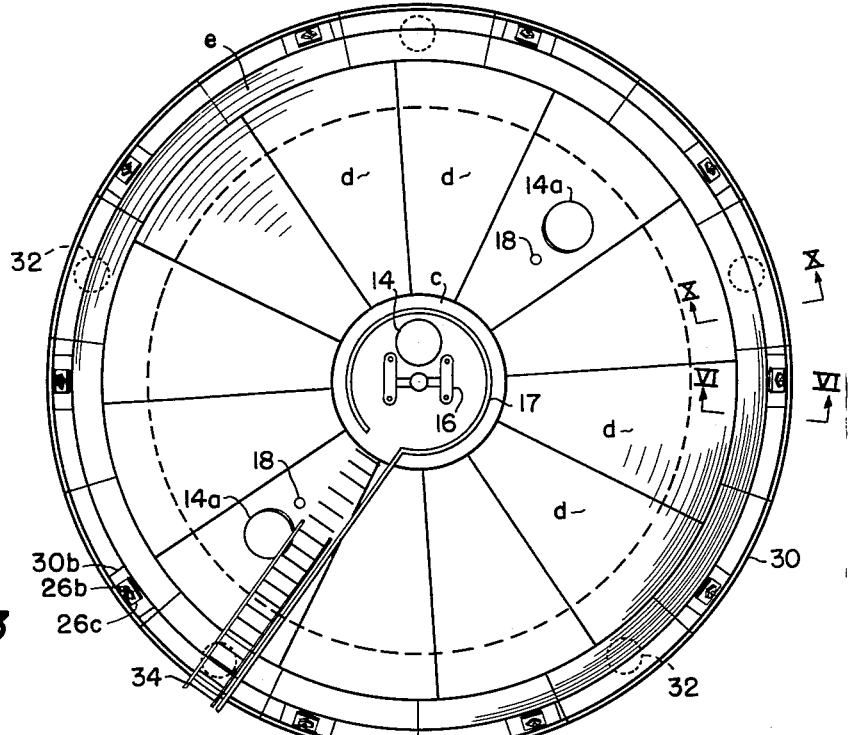
FIGURE 3 is a top plan view, on the scale of FIGURES 1 and 2, of the structure disclosed by those figures.
Figure 4:
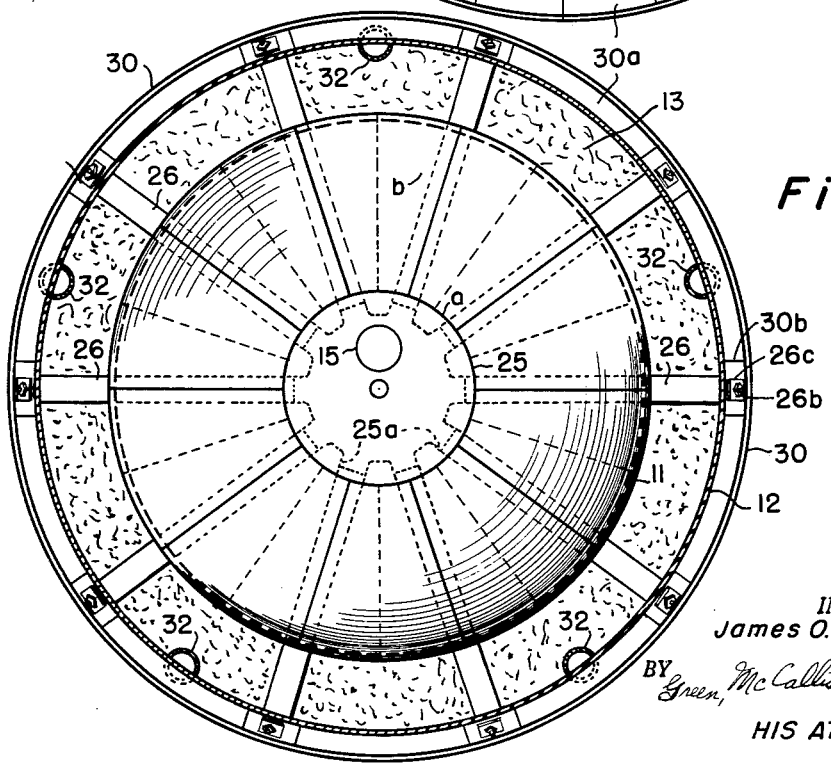
FIGURE 4 is a horizontal section on the scale of FIGURES 1 to 3, and taken along the line IV—IV of each of the FIGURES 1 and 2; however, the inner shell of the structure is not shown in section.

A reference to FIGURES 1, 2, and 3 discloses that the structure may be provided with a suitably positioned top manhole 14 and also side manholes 14a. FIGURES 2 and 4 disclose that a manhole 15 is formed in the inner shell 11 and is preferably located in axial alignment with the manhole 14. These manholes facilitate repair, maintenance, etc., and each is provided with an effective closure. A pressure and vacuum safety release valve assembly 16 is disclosed in FIGURES 1, 2, and 3 and, as shown in FIGURE 2, communicates with the interior of the inner shell 11. As shown in FIGURES 1 and 2, breather valve-tubes 18 also communicate with the interior of the inner sphere 11. A topside circular angle railing 17 is shown at the top or dome of the tank 10 to cooperate with a curved, fixed-position ladder 34.

As shown at the bottom of the outer sphere 12, the tank structure is provided with a protective or insulated boot 19 which encloses fluid-flow piping or conduit 20. The insulation around the conduit aids in maintaining a desired temperature within the tank 10. The piping 20 may be alternately connected as an inlet from a fluid source and as a pressure outlet or nozzle for the tank. As shown, a cone-shaped metal support or enclosure 19a for the lower elbow of the piping 20 provides it with a strengthened supported relationship where reactions may be greater.

Like the space between the shells 11 and 12, the boot 19 is also shown filled with insulating material 13. In this connection, I prefer to employ insulating material of a granular type to completely fill the space between the spheres 11 and 12. For example, loose perlite fines may be vibrated to their maximum density during the installation. For maintenance, inspection, and replacement of the insulating material, I preferably provide a side manhole 21 in the boot 19. The front end of the boot has an annular flange 19b for connecting it in a conventional manner to a suitable piping system.

The inner sphere 11, although substantially equally spaced from the hermetically sealed outer sphere 12, is resiliently supported by a hanger structure or harness which is secured to and supported by the outer sphere 12. The harness cradles the lower portion of the sphere 11 and permits some freedom of movement between it and the sphere 12.

Figure 5:
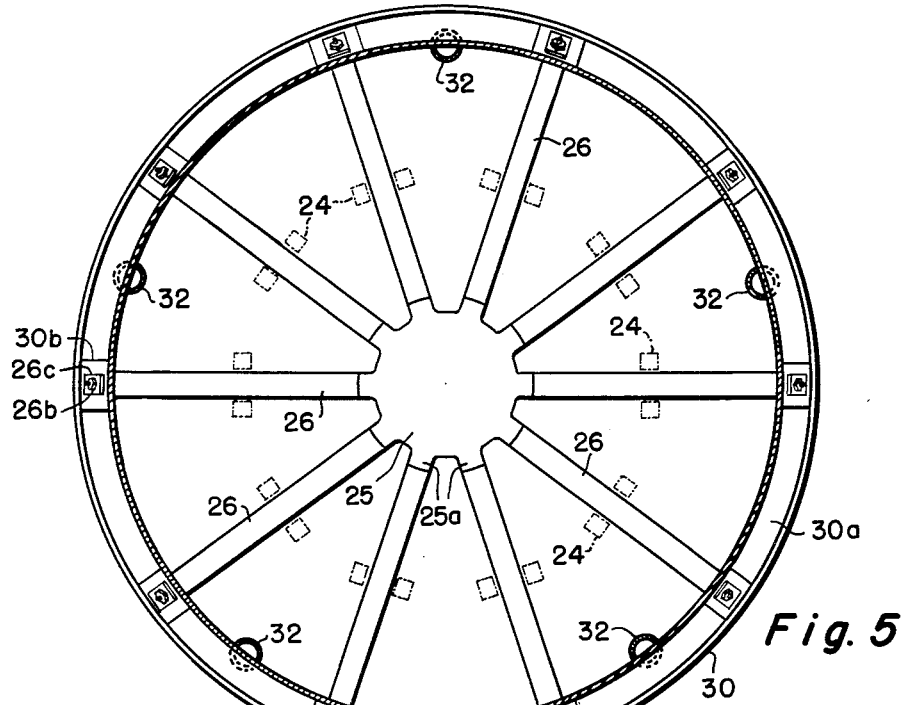
FIGURE 5 is a horizontal section taken along the line IV—IV of FIGURES 1 and 2 but with the inner shell removed to more clearly illustrate the suspension means or harness.

As shown, the harness includes in its make-up a centrally positioned plate or spider-like member 25 formed of an alloy steel. The plate 25 engages the end closure member $a'$ and, like that portion, is rounded or dished. As shown in FIGURES 2, 4 and 5, the harness also includes radially disposed metal strap members 26, each of which is secured, preferably by welding, to a separate scallop like extension 25a of the member 25 and is also secured to the engaged outer surface of the inner sphere 11. As shown in FIGURES 4, 5 and 12, a series of pairs of short bar shaped lugs 24 is secured by welding or otherwise to the outer surface of the inner sphere and project radially thereof. Each pair of lugs is adapted to receive between its members, one of the strap members 26 of the harness and to hold the same in proper position with relation to the sphere 11 during installation of that sphere and also during relative movement between the spheres 11 and 12.

As shown in FIGURE 2, each of these straps 26 engages the lower portion of the sphere 11 throughout a portion of its length and then extends tangentially of the outer surface of the sphere and upwardly and outwardly through the space between the spheres 11 and 12.

Figures 6, 7:
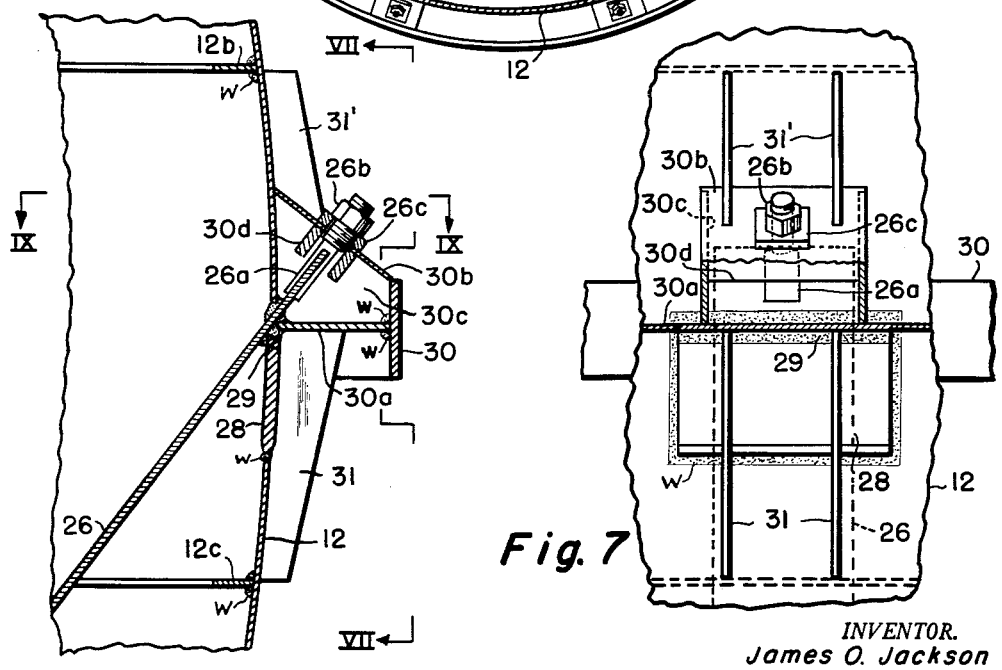
FIGURE 6 is an enlarged vertical fragmental sectional view taken along the line VI—VI of FIGURE 3.
FIGURE 7 is a vertical, fragmental view on the same scale as FIGURE 6, and taken at right angles thereto and as if from the line VII—VII of FIGURE 6; this view discloses the outer appearance of a joint located midway between the upper and lower hemispheres of the tank.

As shown in FIGURES 6 and 7, the upper end of each of the straps 26 extends through a separate aperture formed in the shell of the outer sphere 12. Each such aperture may be, and preferably is, located at the medial line of the sphere 12. The outer end of each strap is provided with at least one bolt extension 26a which extends through a gusset plate 30b and is provided at its end with a nut 26b. The plate 30b is heavily reinforced by stays 30d and forms a part of a support structure which includes an encircling girder 30 and a radially extending plate 30a. As shown in FIGURES 6 and 8, the plate 30a extends between the weld joint 29 and the encircling girder 30 and is reinforced by stiffening ribs 31 which are secured by welding to the outer surface of the sphere 12. It is, however, noted that the shell of the sphere 12 is reinforced at the points of connection of each strap 26 by a relatively thick inset plate 28 which is preferably formed of alloy steel (see FIGURES 6 and 7).

During the operation of erecting the spheres it is preferable to partially load the inner sphere with some liquid such as water and to then equalize the load on the different straps 26 by the use of a torque wrench on the bolts 26b. When this equalization is accomplished the weld 29 is completed, thus securing the straps 26 in place and the radial plates 30a to the shell of the sphere 12.

As shown in FIGURES 2 and 10, the outer sphere 12 may be provided with inwardly projecting reinforcing rings 12b and 12c. These rings are shown as equally spaced above and below the medial line of the sphere 12 and each extends around the sphere and is uniformly welded to the inner surface of its shell throughout its length.

In FIGURE 11 I have shown a conduit 22 which communicates with the interior of the inner sphere 11, extends through the space between the spheres 11 and 12 and out through an opening formed in the sphere 12. The inner end of the pipe 22 is shown as welded to a thickened circular disc 11a which, as shown, is set into the shell of the sphere 11 and welded in place therein. The disc 11a is preferably thicker than the adjacent portions of the inner shell and is welded to the inner end of the pipe 22.

The aperture in the shell of the outer sphere 12 through which the pipe extends is reinforced by a circular disc 12d which overlaps the edge of the aperture in the shell and is also apertured to accommodate the passage of the pipe 22 through the shell 12. The plate 12d is welded to and forms a part of the shell of the sphere 12. The aperture formed in the plate 12d is shown as surrounded by a sleeve 22c which is secured by welding to the disc 12d and lies parallel to but spaced from the pipe 22. In order to hermetically seal the space between the spheres 11 and 12 I have provided a flexible connection between the collar 22c and a collar 22a which surrounds and is welded to the pipe 22. A flexible connection such as a "Solaflex" 22b or similar type of flexible connection surrounds the pipe 22 and extends between and is secured to the collars 22a and 22c. This connection is formed of resilient metal in the form of a bellows or Sylphon-like sleeve, the convolutions of which accommodate relative movement between the spheres such as may be occasioned by expansion and contraction.

The outer end of the pipe 22 is shown as provided with a flanged extension 23 which, like the pipes 14, 15, and 14a shown in FIGURE 2, is adapted to receive a cap closure. A flexible connection such as here described and illustrated in FIGURE 11, is preferably employed in connection with the pipes 16 and 18 shown in FIGURES 1 and 2.

Strut type cylindrical columns 32 serve as supports for the tank structure and, at their lower ends, are mounted by suitable base plates 35. Each column 32 may be secured to the sphere 12 as shown in FIGURE 10. The upper end of each column 32 is fitted against, and welded to the outer surface of the sphere 12 and is cut to provide a supporting ledge 32a which engages and is secured to the plate 30a of the support structure. As shown in FIGURE 10, each column is, in effect, continued on the inside of the sphere 12 by means of a piece of curved steel plate 32' with the lateral edges thereof fitted against the welded to the inner surface of the sphere 12. Each piece 32' abuts against and is secured to the uppermost rib 12b and interrupts the lower member 12c of the pair. Thus the piece 32' cooperates with each column in supporting the tank structure.

Suitable reinforcing cross bracing rods 33 as shown in FIGURES 1 and 2 as extending between the columns 32 and as secured to upper and lower tab portions 32c and 32d welded to the columns. Turnbuckles 33a are shown for adjusting the tension of the rods 33.

In accordance with the invention, the radiating strap members 26 serve to cradle and support the inner tank 11, its contents on the outer shell 12 and therefrom on the leg columns 32. If desired these radiating members 26 may be a multiple of the number of columns and are preferably placed symmetrically located around the tank structure and with relation to each of the columns.

The transfer of heat between the inner and outer spheres is a minimum. While the strap members 26 tend to transfer some heat from sphere to sphere, this transfer is held at a minimum due to the length of the members 26 and the fact that throughout a substantial portion of their length each member is embedded in insulating material. It will also be noted that the suspension members 26 and terminal members 27 provide a symmetrical distribution of forces throughout the tank structure. That is to say, the weight of the inner tank 11 and its contents is equally distributed to the sphere 12 and to the different columns 32 by the radiating members 26 and the arrangement of the support columns 32 is such with relation to the sphere 12 that each column bears a substantially equal portion of the weight of the entire tank structure.

In the various figures of the drawings the reference letter w designates a weld connection.

What I claim is:

1. In a storage tank an inner shell spherical in form enclosing a storage chamber; an outer shell spherical in form spaced from and enclosing said inner shell; a horizontally disposed girder surrounding and secured to said outer shell; a harness loosely engaging and supporting said inner shell and including a concave disk in supporting engagement with said inner shell; a plurality of strap-like members secured to and radiating from said disk, each engaging and partially surrounding said inner shell and projecting through and secured to said outer shell and to said girder; a plurality of tank-supporting columns located in spaced relation around said girder and secured to said girder and to the outer shell; and inlet and outlet passages communicating with said inner shell and extending through said outer shell.

2. In combination in a storage tank, a substantially spherical inner shell enclosing a storage chamber; a substantially spherical outer shell spaced from and concentric with said inner shell; a horizontally extending girder encircling said outer shell and secured thereto adjacent the medial line thereof; a support harness for said inner shell secured only to said outer shell and said girder and including an imperforate central plate located in supporting engagement with the lower portion of said inner shell and a plurality of strap members secured to and radiating from said central member and extending upwardly in supporting contact with said inner shell and outwardly through said outer shell; and separate means for securing the outer end of each of said strap members to said girder and said outer shell.

3. In a storage tank, an inner shell of globular form enclosing a storage chamber; an outer shell of globular form spaced from and enclosing said inner shell; a support harness for said inner shell secured to said outer shell and consisting of a concave disk freely engaging the lower portion of said inner shell and a plurality of substantially equally spaced strap members secured to and radiating from said disk, with each such member extending upwardly and freely engaging and partially surrounding a portion of said inner shell and projecting outwardly through said outer shell; a horizontally extending girder extending around and secured to said outer shell; means for adjustably securing the outer end of each such member to said girder and said outer shell; and means for supporting said outer shell rigidly secured thereto.

4. In combination a tank structure, an inner spherical shell enclosing a storage chamber; an outer shell of spherical form spaced from, concentric with, and enclosing said inner shell; a horizontally disposed circular girder surrounding and secured to the medial portion of said outer shell; a supporting structure for said inner shell consisting of a dished disc located in supporting engagement with the lower portion of said inner shell and having a plurality of equally spaced strap members secured thereto and radiating therefrom with each such member engaging a portion of the inner shell and extending through the outer shell and secured to said girder; and separate means spaced around and secured to said girder for supporting said tank structure.

5. In a tank structure a spheroidal shell, a horizontally disposed girder surrounding said shell and secured thereto, a continuous horizontally disposed rib extending around and secured to the inner surface of said shell; a plurality of support columns spaced one from the other with the upper end of each such column terminating at and secured to said girder and secured along a portion of its length to the outer surface of said shell; and a plurality of structural pieces each fitted against and secured to the inner surface of said shell, each at a location opposite a separate one of said columns and each secured to said rib.

6. A tank structure including a hollow sphere enclosing a storage chamber; an outer sphere spaced from and enclosing said inner sphere; heat insulating material located between said spheres and surrounding said inner sphere; an annular, horizontally disposed girder surrounding and secured to said outer sphere adjacent the equatorial line thereof; a horizontally disposed ring secured to the inner surface of said outer sphere and positioned adjacent to the position of said girder on said outer surface; a plurality of hollow upwardly extending columns spaced around said outer sphere, each engaging said girder and along the upper portion thereof fitted to the outer surface of said outer sphere with the fitted edge thereof secured to said outer surface; and a plurality of spaced structural pieces fitted to and with the fitted edges of each such piece secured to the inner surface of said outer sphere and so positioned that the upper end of each such piece engages said ring and the fitted edge of at least some such pieces are located opposite the fitted portion of some such columns; and a supporting harness engaging the inner sphere and extending through said insulating material and adjustably secured to said outer sphere.

7. In a tank structure, an inner shell of spherical form enclosing a storage chamber; an outer shell enclosing said inner shell; a horizontally disposed girder surrounding said outer shell and secured thereto; a supporting harness for said inner shell including a substantially circular disc located in supporting engagement with said inner shell; and a plurality of spaced radiating members secured to said disc, each such member extending through said outer shell and secured thereto and to said girder adjacent to the point of penetration of said shell.

8. In a tank structure, a spherical shell, a horizontally disposed girder surrounding and secured to said shell, a circular rib secured to the inner surface of said shell, positioned in said shell above and extending parallel to said girder, a plurality of supporting columns for said shell, spaced one from the other around said shell and each secured to said girder and along a portion of its length to the outer surface of said sphere, and a plurality of transversely curved and tapered structural pieces secured to the inner surface of said shell with each such piece located at a position opposite a separate one of said columns and in abutting engagement with said rib.

9. In combination in a tank structure, an inner spherical shell enclosing a storage chamber; an outer shell of spherical form spaced from, concentric with, and enclosing said inner shell; a plurality of spaced columns surrounding and secured in supporting engagement to said outer shell; a support structure for said inner shell including in its makeup a disc of substantially circular form located in supporting engagement with the lower portion of said inner shell and having a plurality of spaced straplike members radiating therefrom and secured thereto, with a portion of each such member engaging a portion of the outer surface of said inner shell, extending through and secured to said outer shell; a plurality of curved, tapered structural pieces spaced around and secured to the inner surface of said outer shell, each such piece being located opposite to and forming in effect an extension of a separate one of said columns.

10. In combination in a storage tank, a globular shell enclosing a storage space; a globular shell surrounding said first mentioned shell in spaced relationship thereto; a plurality of substantially upright supporting columns located in spaced relationship around said outer shell with the upper portion of at least some of said columns fitted to and secured to the outer surface of said outer shell along the fitted portion thereof; and a plurality of longitudinally extending curved structural pieces, each fitted to the inner surface of said other shell and each secured thereto along the fitted portion thereof, with each such piece so positioned on said inner surface that the fitted portion thereof lies opposite to the fitted portion of a separate one of said columns and forms, in effect, an extension of such column.

References Cited in the file of this patent

UNITED STATES PATENTS

| Number | Name | Date |
|---|---|---|
| 1,886,517 | Heylandt | July 9, 1932 |
| 1,979,224 | Hansen et al. | Oct. 30, 1934 |
| 1,997,808 | Blackburn | Apr. 16, 1935 |
| 2,042,427 | Kinzel | May 26, 1936 |
| 2,156,400 | Pechstein | May 2, 1939 |
| 2,198,315 | Nyberg | Apr. 23, 1940 |
| 2,256,673 | Hansen | Sept. 23, 1941 |
| 2,363,992 | Reiser | Nov. 28, 1944 |
| 2,427,676 | Horton | Sept. 23, 1947 |
| 2,512,308 | Cooper | June 20, 1950 |
| 2,577,171 | Wiggins et al. | Dec. 4, 1951 |
| 2,587,204 | Patch | Feb. 26, 1952 |

FOREIGN PATENTS

| 487,466 | Germany | Dec. 16, 1929 |